United States Patent [19]

Wachter et al.

[11] Patent Number: 5,346,875
[45] Date of Patent: Sep. 13, 1994

[54] METHOD OF MANUFACTURING FLUID CATALYTIC CRACKING CATALYST

[75] Inventors: William A. Wachter, Baton Rouge, La.; Stuart L. Soled, Pittstown, N.J.

[73] Assignee: Exxon Research and Engineering Company, Florham Park, N.J.

[21] Appl. No.: 95,612

[22] Filed: Jul. 21, 1993

[51] Int. Cl.$^5$ .................. B01J 21/12; B01J 29/04; B01J 37/03

[52] U.S. Cl. .................. 502/233; 502/64; 502/235; 502/263

[58] Field of Search .................. 502/233, 235, 263, 64

[56] References Cited

U.S. PATENT DOCUMENTS

| | | | |
|---|---|---|---|
| 2,595,339 | 5/1952 | Den Herder et al. | 502/235 |
| 2,886,511 | 5/1959 | Van Dyke et al. | 502/235 |
| 3,860,532 | 1/1975 | Takase et al. | 502/235 |
| 5,051,385 | 9/1991 | Wachter | 502/64 |

FOREIGN PATENT DOCUMENTS

| | | | |
|---|---|---|---|
| 0545045 | 8/1957 | Canada | 502/2323 |
| 0657964 | 2/1963 | Canada | 502/235 |

*Primary Examiner*—Carl F. Dees
*Attorney, Agent, or Firm*—Richard D. Jordan

[57] ABSTRACT

This invention is to a method of manufacturing fluid catalytic cracking catalyst. In particular, the invention is to a method of manufacturing a catalytic cracking catalyst which incorporates a step of matching the isoelectric point of each component of the catalyst framework structure to the pH of an inorganic oxide sol used to form the matrix component of the catalyst. The resulting catalyst product has a controlled pore size and is extremely durable.

8 Claims, No Drawings

METHOD OF MANUFACTURING FLUID CATALYTIC CRACKING CATALYST

FIELD OF THE INVENTION

This invention is to a method of manufacturing fluid catalytic cracking catalyst. In particular, the invention is to a method of manufacturing a catalytic cracking catalyst which incorporates a step of matching the isoelectric point of each component of the catalyst framework structure to the pH of an inorganic oxide sol used to form the matrix component of the catalyst.

BACKGROUND OF THE INVENTION

Fluid catalytic cracking catalysts generally contain a framework structure comprising a crystalline tetrahedral framework oxide component, an active porous inorganic oxide catalyst framework component, and an inert catalyst framework component. The framework structure is typically held together by attachment with an inorganic oxide matrix component.

Each component of a fluid catalytic cracking catalyst has its own particular function. The tetrahedral framework oxide component catalyzes the breakdown of primary products from the catalytic cracking reaction into clean products such as naphtha for fuels and olefins for chemical feedstocks. The active porous inorganic oxide catalyst framework component catalyzes the formation of primary products by cracking hydrocarbon molecules that are too large to fit inside the tetrahedral framework oxide component. The inert catalyst framework component densifies, strengthens and acts as a protective thermal sink. The inorganic oxide matrix binds the catalyst framework structure components together so that the catalyst product which is formed is hard enough to survive interparticle and reactor wall collisions.

In addition to acting as a binder material, the matrix component also serves as a reactive medium for the diffusion of feedstock and cracked products. In general, the matrix will have a pore structure that allows the diffusion of hydrocarbon molecules in and out of the catalyst particles. This pore structure is desirably one that will not deteriorate during severe hydrothermal treatment of the catalyst. By favoring or inhibiting the diffusion of certain hydrocarbon molecules, the pore structure will affect the activity and selectivity of the catalyst.

The matrix also serves as a diluting medium for the crystalline tetrahedral framework oxide component. This moderates catalyst activity and avoids overcracking of the products to coke and gas.

The matrix can also act as a sink for sodium ions. Through solid-solid ion exchange, the sodium ions migrate from the crystalline tetrahedral framework oxides into the matrix, which increases the thermal and hydrothermal stability of the catalyst.

The matrix further acts as a heat carrier for typical fluidic catalytic cracking systems. By facilitating heat transfer during both the cracking and regeneration steps, the crystalline tetrahedral framework oxide is provided additional protection from structural damage.

Until recently, the crystalline tetrahedral framework oxide content of catalytic cracking catalysts was low enough such that the structure of the matrix was tailored to favor activity and selectivity over strength (i.e., attrition resistance). However, present catalytic cracking catalysts typically contain a relatively high concentration of crystalline tetrahedral framework oxide; as much as 60 wt %. At relatively high crystalline tetrahedral framework oxide concentrations, the matrix component must be manufactured to have increased attrition resistance, while maintaining activity and selectivity.

Matrices of catalytic cracking catalysts have historically been formed from simple amorphous gels of silica-alumina or silica-magnesia. These gels contained agglomerated sol particles having pore diameters, on drying, in the range from 20 Å to 120 Å. Matrices based on silica and alumina sols have also been developed.

Catalysts manufactured with sols do not have particularly desirable pore structure, although these catalysts typically have relatively good attrition resistance. The undesirable pore structure is primarily due to the fact that the sol particles are generally so small that they can "blind" the pores of the zeolite. The result in most cases is that the pore structure is too small to effectively crack large gas oil molecules into intermediate products so that the intermediate products can enter into and be cracked inside the crystalline tetrahedral framework oxide component.

In an effort to balance pore structure with attrition resistance, monodispersed mesoporosity has been introduced into FCC catalysts. "Monodispersed mesoporosity" in this context means that a substantial portion of the pore structure above 150 Å is provided by the interaction of components whose ultimate particle size is approximately one-half to one-third the desired pore diameter. Materials made in this way tend to have a well-defined region of mesoporous behavior. This type of pore structure reflects an underlying relationship between the catalyst components which confer greater strength and catalyst components which provide accessibility to the catalytically active components.

Catalysts which have a pore structure above about 150 Å do not typically have enough surface area to efficiently convert large gas oil molecules to the distillate range fraction which can enter into the crystalline tetrahedral framework oxide. Therefore, it is useful to employ material s which themselves have surface areas in the 30–150 Å pore diameter region or which can be converted into material s with surface areas in the 30–150 Å pore diameter region. However, many of the prior art catalysts having pore diameters in the 30–150 Å range have undesirably high coke yields. See, for example, EP 350 280 which discloses catalyst greater than about 90 Å in diameter as being more desirable compared to smaller diameter catalyst such as that described in U.S. Pat. No. 3,944,482.

SUMMARY OF THE INVENTION

It is an object of this invention to overcome many of the problems inherent in the prior art. In order to overcome these problems, the invention provides for a method of manufacturing a catalytic cracking catalyst which comprises providing a framework structure having a measurable isoelectric point, wherein the framework structure is at least one component selected from the group consisting of a crystalline tetrahedral framework oxide component, an active porous inorganic oxide catalyst framework component, and an inert catalyst framework component; providing an inorganic oxide sol having a measurable pH; measuring the isoelectric point of each component of the framework structure; measuring the pH of the inorganic oxide sol; matching the isoelectric point of each component of the framework structure to the pH of the inorganic oxide sol; combining in solution the inorganic oxide sol with each component of the framework structure; and drying the combined suspension.

In certain preferred embodiments of the invention, the inorganic oxide sol is a silica sol or alumina sol. Preferably, the inorganic oxide sol is provided by reacting a solution of sodium silicate with a solution of aluminum sulfate and sulfuric acid, or the inorganic oxide sol is preferably an aluminum chlorhydrol sol. Preferably, the inorganic oxide sol has a pH of about 2–10.

In another preferred embodiment of the invention, the framework structure includes at least one component selected from the group consisting of an active porous inorganic oxide catalyst framework component and an inert catalyst framework component, and the isoelectric point of the framework structure component is matched to within about 2 pH units of the inorganic oxide sol. In another aspect, the framework structure includes the tetrahedral framework oxide component, and preferably, the isoelectric point of the tetrahedral framework oxide component is matched to within about 0.5 pH units of the inorganic oxide sol.

In another preferred embodiment of the invention, the framework structure comprises a crystalline tetrahedral framework oxide component of silicon and aluminum. Preferably the framework oxide component has a Si/Al surface ratio of at least 0.5/1 and a Si/Al bulk ratio of at least about 2/1.

DETAILED DESCRIPTION OF THE PREFERRED EMBODIMENTS

The crystalline tetrahedral framework oxide component which is used in this invention is preferably one of the classes of tetrahedral framework oxides such as those described in Szostak, R., *Handbook of Molecular Sieves*, New York, N.Y., Van Nostrand Rheinhold. 1992. In these systems, the anionic (non-exchangeable) portion of the framework includes tetrahedral silicon, aluminum, or phosphate. Subclasses of this group include zeolites, tectosilicates, tetrahedral aluminophosphates (ALPO's) and tetrahedral silicoaluminophosphates (SAPO's). Preferably, the crystalline tetrahedral framework oxide has a faujasite type USY zeolite (FAU) framework structure, a Si/Al ratio of greater than 2.5, or both.

The active porous inorganic oxide catalyst framework component of this invention is preferably a porous inorganic oxide that cracks a relatively large amount of hydrocarbons into lower molecular weight hydrocarbons as compared to an acceptable thermal blank. A low surface area silica (e.g., quartz) is one type of acceptable thermal blank. The extent of cracking can be measured in any of various ASTM tests such as the MAT (microactivity test, ASTM #D3907-8). Compounds such as those disclosed in Greensfelder, B. S., et al., *Industrial and Engineering Chemistry*, pp. 2573–83, Nov. 1949, are desirable. Alumina, silica-alumina and silica-alumina-zirconia compounds are preferred.

The inert catalyst framework component in this invention is a component which does not have a cracking activity that is significantly greater than the acceptable thermal blank. Kaolin and other clays as well as α-alumina, titania, zirconia, quartz and silica are examples of preferred inert components. These components are also effective in reducing overall catalyst cost, diluting catalyst activity, acting as a thermal "sink" for heat from the regenerator portion of an FCC unit, densifying the catalyst and increasing catalyst strength.

The inorganic oxide matrix formed in the product of this invention is made using an inorganic oxide sol. The inorganic oxide sol is essentially a "glue" which binds the group of catalyst framework components together. Upon drying of the inorganic oxide sol, the inorganic oxide matrix component of the catalyst is formed. Preferably, the individual catalyst components which are glued together are about 0.3–10.0 microns in size, while the inorganic oxide matrix component formed in the final product preferably has a measurable diameter of less than about 1000 Å, more preferably a diameter of about 10–500 Å.

It is preferable that separate alumina phases be incorporated into the inorganic oxide matrix component of this invention. Species of aluminum oxyhydroxides-γ-alumina, boehmite, diaspore, and transitional aluminas such as α-alumina, β-alumina, γ-alumina, δ-alumina, ε-alumina, κ-alumina and ρ-alumina can be employed. In general, any alumina species having an isoelectric point which is less than about 6 can be used. Even if an alumina species does not initially have an isoelectric point of about 6, surface modification of aluminas is known to reduce the isoelectric point by as much as 4 pH units. (Parks, G. A., *Chem. Rev.* (1965), 65, 177–198). Preferably, the alumina species used in this invention is an aluminum trihydroxide such as gibbsite, bayerite, nordstrandite, or doyelite.

In forming the sol solution used in this invention, it is preferable that the particles which form the inorganic oxide matrix are separated from one another as well as from the additional particles making up the catalyst. Preferably, the particles have a diameter of about 10–10,000 Å, and will have a high solids content. Preferably, the solids content will be at least about 10 wt %, more preferably at least about 20 wt %. The preferred sol solution will also have a relatively low viscosity, preferably less than about 50,000 centipoise. A sol solution having the preferred characteristics will have high reliability in forming the desired dry matrix component.

The inorganic oxide matrix is preferably formed from a silica or alumina sol. The terms "silica sol" and "alumina sol" mean that the sol solution predominantly comprises silica or alumina, respectively. The sol may be further identified by a ratio of silica to alumina or vice versa. Typically, both silicon and aluminum atoms will be present in either a silica or alumina sol.

When the inorganic oxide matrix of this invention is formed from a silica sol, the silica sol can be modified by the incorporation of alumina from an aluminum sulfate/sulfuric acid solution used to neutralize the sodium silicate from which the silica sol is derived. The silica sol preferably has a Si/Al ratio of greater than about 1, more preferably greater than about 5. This ratio can vary within the preferred ranges depending upon the nature of the species which are to be bound by the matrix. For example, the matrix used for binding highly siliceous tetrahedral framework oxides at low isoelectric points (where zeta potential=0 at pH<7) would require a higher Si/Al ratio so that its own isoelectric point would match that of the tetrahedral framework oxide.

One example of a preferred type of sol which can be used in the preparation of this invention is a sol that is made by reacting a solution of sodium silicate with a solution of aluminum sulfate and sulfuric acid under conditions of rapid mixing. Preferably, the pH of the resultant sol is about 2-4. The sol solution is preferably formed at high shear. This can be accomplished by mixing the particle components of the sol in solution at a pH as low as about 1 and raising the pH to about 3. Preferably, the pH is raised using a sodium silicate solution.

Another example of a preferred type of sol which can be used in this invention is aluminum chlorhydrol, $Al_{1.3}(OH)_5Cl.5H_2O$. The pH of the sol containing this material is preferably about 2-10, more preferably about 3-8. It is also preferable that the particle components of the sol are combined in solution so that they do not form a gel.

The pH of the inorganic oxide sol can be measured using standard glass electrodes or other methods known to those skilled in the art. Preferably, the pH of the inorganic oxide sol will be about 2-10.

The isoelectric point of a composition is the point at which the concentration of a potential determining ion confers on a composition a net zero charge on its surface so that its mobility in an electric field is zero. The determination of isoelectric point has been described by Hunter, R. J. in *Zeta Potential in Colloid Science, Principles and Applications*, New York, N.Y., Academic Press, Harcourt, Brace and Janovich 1988.

It is preferable in this invention that the isoelectric point of the individual components of the framework structure be measured by electrokinetic sonic analysis. In this analysis, an alternating electric field is applied to a colloidal dispersion. If there is a density difference between the supporting solution and the particles, momentum is transferred to the particles and an acoustic signal which develops is monitored. This coupling of electromotive force, mechanical frequencies and related phenomena are described in Babchin, A. J., Chow, R. S., and Sawatzky, R. P., *Advances in Colloid and Interface Science*, 111, 30,(1989). Preferably, the isoelectric point of the tetrahedral framework oxide component will be about 2-10.

The isoelectric point of each component of the framework structure of this invention can be altered as needed. For materials with a low Si/Al ratio, the isoelectric point can be modified by adding a specifically adsorbing ion such as sulfate or phosphate to a slurry of the framework structure components and then spray drying. The adsorption of an ion, particularly a multivalent ion, on the surface of any one of the framework structure components can significantly affect the isoelectric point of that component. Thus, specific ion adsorption produces framework structure components which have effectively the same isoelectric point.

According to the method of this invention, the isoelectric point of each of the framework structure components of the catalyst is matched to the pH of the inorganic oxide sol before, during or after the components are combined. When the framework structure includes an active porous inorganic oxide catalyst framework component or an inert catalyst framework component, the isoelectric point of each of these components is preferably matched to within about 2 pH units of the inorganic oxide sol. When the framework structure includes a crystalline tetrahedral framework oxide component, it is preferable that the isoelectric point of the crystalline tetrahedral framework oxide component be matched to within about 0.5 pH units of the inorganic oxide matrix sol.

Either the isoelectric point of each of the framework structure components can be modified to match the pH of the inorganic oxide sol, or the pH of the inorganic oxide sol can be adjusted to match the isoelectric point of the particular framework structure component. The isoelectric point of any of the framework structure components can be modified to match the pH of the inorganic oxide sol by modifying the surface composition of the particular framework structure component.

The surface composition of any of the framework structure components can be modified by either adding or removing surface aluminum or silicon species. For example, treatment with steam such as is done in the manufacture of faujasite-type zeolites, known as ultrastable-Y zeolites, results in a net enrichment of the surface in alumina over that which is found in the bulk portion of the component. On the other hand, various acid treatments can also be used to increase the Si/Al ratio of zeolites such as faujasite. These types of procedures are known and are described in the scientific literature, e.g. Kerr, G. T., *J.Phys. Chem.*, 72:2594 (1968), Scherzer, J., *J. of Catal.*, 54:285-288 (1978), and in patents such as Breck, D. W., and Skeels, G. W., U.S. Pat. No. 4,503,023, and Dai, P-S.E., Sherwood, D. E., Jr., U.S. Pat. No. 5,143,878, each of which the teachings are fully incorporated herein by reference. Treatment procedures for the inert catalyst framework components are also well described in the literature, e.g., Swartzen-Allen, S. L., and Matijevic, E., *Chem. Rev.*, 385-400 (1974), the teaching of which is also fully incorporated herein by reference. A brief survey of the effect of various treatments on the surface Si/Al ratio as compared with the bulk Si/Al ratio of zeolites is contained in Ponthieu, E. and Grange, P., *Zeolites*, 12:402-411 (1992), the teaching of which is also fully incorporated herein by reference.

The framework structure components of this invention are the components of the catalyst which are not a part of the inorganic oxide matrix. These components are selected from the group consisting of the tetrahedral framework oxide component, active porous inorganic oxide catalyst framework component, and inert catalyst framework component. Preferably, the framework structure components comprise silicon, aluminum, phosphate or some combination of two or more of such compounds. Such components can have a surface composition which differs from the bulk or base composition, since the surface composition essentially determines the isoelectric point of each component.

Preferably, the crystal line tetrahedral framework oxide component of this invention comprises an oxide framework of silicon and aluminum having a Si/Al surface ratio of at least about 0.5/1, more preferably a surface ratio of at least about 3/1. The tetrahedral framework oxide will also preferably have a Si/Al bulk ratio of at least about 2/1, more preferably at least about 2.5/1. Using the preferred combination, a strong catalyst can be formed when compounded with a matrix sol which has a pH of between about 2 and 10.

It is particularly preferred that a tetrahedral framework oxide having an external Si/Al ratio lower than 3 be successfully compounded with a sol matrix having a pH of 3 by lowering the bulk Si/Al ratio of the sol. Conversely, a tetrahedral framework oxide having a surface Si/Al ratio greater than 3, is preferably compounded with a sol matrix having a pH of 3 by increasing the bulk Si/Al ratio of the sol to match the surface Si/Al of the tetrahedral framework oxide. Increasing and lowering the Si/Al ratio can be accomplished according to any of various methods known in the art.

In order to match the surface characteristics of an inorganic matrix sol to the isoelectric point of a framework structure component, the isoelectric point of the framework structure component is first measured. This can be done with any of a number of commercial units specifically designed for measuring zeta potential via electrokinetic techniques. Among these electrokinetic techniques are electrophoresis, sedimentation potential, streaming potential, electroosmosis, colloid vibration potential and electric sonic amplitudes.

After the isoelectric point of the framework structure component is determined, the framework structure component is preferably combined with a sol having a pH within about 2 units of the isoelectric point of the framework structure component. In most cases, the potential determining ion is the hydronium or hydroxyl ion. However, in the presence of specifically adsorbing anions, the isoelectric point is determined by the surface concentration of the specifically adsorbing ions as well as the hydronium or hydroxide ions. For example, a zeolite with a high alumina concentration on its surface typically has an isoelectric point greater than 7. On the other hand, a standard metastable mineral acid silica sol, which can made by reacting sodium silicate with a solution of sulfuric acid and aluminum sulfate, typically has a pH of about 3.

In order to match the pH of the sol, the isoelectric point of the zeolite can be lowered by increasing the sulfate surface concentration, As stated above, this can be accomplished by using any of the standard methods known in the art. Once the sol and the framework structure component are matched, they are combined in solution and dried. The result is a catalyst which is highly attrition resistant.

Any of the framework structure components can be combined with the matrix sol either as a suspension of the framework structural component in water or as a dry powder which is added to a well-mixed sol. When the framework structural component and the matrix sol have been properly mixed (i.e., slurried) the combination is dried to form the catalytic cracking catalyst.

The slurry is spray dried by feeding it into a nozzle which breaks the slurry into small particles which are then dried in a cocurrent or countercurrent flow of air through the spray drier. The pore size of the catalysts made in the spray drier are set by the relationship between the components comprising the catalyst and the conditions in the spray drier. Spray drying conditions are well known in the art.

Having now generally described this invention, the same will be better understood by reference to specific examples which are included herein for purposes of illustration only and are not intended to be limiting of the invention, unless specified.

EXAMPLE 1

9.01 lb of an acid modified ultrastable Y zeolite (USY zeolite; 77.3% $SiO_2$; 22.0% $Al_2O_3$; 0.43% Na) having an isoelectric point of 3.8 and 20.0 lb of silica sol (Nalco 2326) were mixed together with 6.0 lb of Georgia kaolin (Hydrite UF), and passed through a colloid mill and set aside.

6.36 lb of Reheis chlorhydrol was dissolved in 8.0 lb of distilled water and mixed in a pump-around. The pH of this solution was ca. 4.3.

Then the USY zeolite/Nalco-2326/Hydrite UF mixture was poured into the chlorhydrol solution in the pump-around slowly enough to keep the mixture from clotting. The pH of the zeolite/clay/sol/chlorhydrol slurry was 4.3. The density of the slurry was 1.35 g/cc.

The slurry was spray dried at 550° F. inlet temperature, 350° F. outlet temperature, through a nozzle rotating at 15,000 rpm. Ca. 8 lb of the spray dried product, labelled sample A, was collected and exchanged in a continuous fluidized bed ion exchanger by passing first 100 lb. of water, then 100 lb. of 5% ammonium sulfate, and then 100 lb. of water though the catalyst at ca. 70° C. The catalyst was then dried and calcined at 550° C. for 2 hours to yield a product which was labelled sample A1. Sample A1 was steamed at 1400° F. for 16 h to give a product which was labelled sample A2.

Products A1 and A2 were tested using wet chemical analyses, testing for elemental composition (Na, silica and alumina), nitrogen adsorption (ASTM D3663), for BET surface area, zeolite crystallinity (ASTM D 3906), $N_2$ adsorption for pore volume (ASTM D4222), and the Davison attrition index was measured according to the method of U.S. Pat. No. 5,168,086. The results are shown in Table 1.

TABLE 1

|  | sample A1 | sample A2 |
|---|---|---|
| Na, wt % | 0.08 | 0.08 |
| Silica, wt % | 65.2 | 65.2 |
| Alumina, wt % | 35.4 | 35.4 |
| Surface area, $m^2$/gm | 299 | 204 |
| pore volume, ml/gm | 0.237 | 0.217 |
| crystallinity, % | 27 | 32 |
| attrition, Davison index | 1.1 | — |

EXAMPLE 2

Catalyst was prepared as in Example 1 and several lots similar to sample A2 were obtained. The lots were tested for catalyst activity according to the microactivity test (MAT, ASTM #D3907-D; also described in *Oil & Gas Journal*, 1976, vol. 64, pp. 7, 84–85, and Nov. 22, 1971, pp. 60–68). 2.0 cc of feed (API gravity 22.5; 1.15 wt % sulfur; refractive index 1.4928; aniline point 179; 0.063 wt % total nitrogen; pour point 95° F.; Hivac C (10/50/90) 400°/456°/519° C.) was injected over 5.0 gm of the catalyst lots at a temperature of 482° C. over a period of 80 seconds. The conversion of feed to products which boiled at less than 220° C. was determined along with coke and hydrogen yields. The coke and hydrogen yields were standardized using a conversion factor (x/(1−x), where x is the conversion from the 220° C.-fbp of the feed). These standardized yields were called "specific coke" and "specific hydrogen" yields, respectively. The results are shown in Table 2.

TABLE 2

| Lot No. | MAT | Sp. Coke | Sp. $H_2$ | C, wt % | $H_2$, wt % |
|---|---|---|---|---|---|
| 1 | 74.2 | 0.86 | 0.016 | 2.467 | 0.0471 |
| 2 | 72.2 | 1.06 | 0.016 | 2.741 | 0.0405 |
| 3 | 73 | 0.89 | 0.014 | 2.416 | 0.0373 |
| 4 | 74.3 | 0.93 | 0.013 | 2.7 | 0.0384 |

EXAMPLE 3 (Comparative)

Catalyst was prepared as in Example 1, except that a USY zeolite (72.24 $SiO_2$; 22.8% $Al_2O_3$; 0.15% Na), having an isoelectric point of 8.8, was used. A portion of the spray dried product was collected and labelled sample B. Ca. 15 lb. of sample B was exchanged in a continuous fluidized bed ion exchanger by first passing 100 lb. of water, then 100 lb. of 5% ammonium sulfate, and then 100 lb. of water though the catalyst at ca. 70° C. The catalyst was then dried and calcined at 550° C. for 2 hours to yield a product which was labelled sample B1. Sample B1 was steamed at 1400° F. for 16 hours to give a product which was labelled sample B2. The products were tested as in Example 1. The results are shown in Table 3.

TABLE 3

| Na, wt % | 0.08 | 0.08 |
|---|---|---|
| Silica, wt % | 62.97 | 62.97 |
| Alumina, wt % | 36.15 | 36.15 |
| Surface area, m²/gm | 271 | 205 |
| pore volume, ml/gm | 0.201 | 0.206 |
| crystallinity, % | 34 | 31 |
| attrition, Davison index | 22.5 | — |

EXAMPLE 4 (Comparative)

Catalyst was prepared as in Example 2 to obtain several lots of sample B2. The lots were analyzed as in Example 2. The results are shown in Table 4.

TABLE 4

| Lot No. | MAT | Sp. Coke | Sp. $H_2$ | C, wt % | $H_2$, wt % |
|---|---|---|---|---|---|
| 1 | 67.8 | 1.29 | 0.011 | 2.708 | 0.0242 |
| 2 | 71.6 | 0.98 | 0.016 | 2.481 | 0.0395 |
| 3 | 69.8 | 1.22 | 0.009 | 2.827 | 0.0216 |
| 4 | 72 | 1.26 | 0.024 | 3.238 | 0.062 |
| 5 | 71 | 1.17 | 0.029 | 2.875 | 0.0718 |
| 6 | 71 | 1.13 | 0.027 | 2.774 | 0.0658 |

EXAMPLE 5

An ultrastable Y zeolite (72.5% $SiO_2$; 23.6% $Al_2O_3$; 2.80% Na) was measured in the presence of sulfate to have an isoelectric point of 3.2. The modified zeolite (9.48 lb; 88.2 wt % solids) was mixed with 30 lb of water, colloid mixed, and the pH of the mixture was adjusted to 3.5–3.7 using 495 cc of 20% concentrated sulfuric acid.

To 28.8 lb of water, was added 21.2 lb of "N" brand (PQ Corp.) sodium silicate (28.74 $SiO_2$; 8.90% Na);. 32.8 lb of this solution was placed in an "on-balance" tank and the remaining solution was placed in an "off-balance" tank. To 28.1 lb of water was added 5.00 lb of concentrated sulfuric acid and 7.09 lb of aluminum sulfatepentadecahydrate. The acid alum was pumped to a slop tank and then the sodium silicate solution was turned on. When the pH of the emerging stream rose to 3.0 the rate of the silicate solution was not increased further. The silica sol stream was then diverted to an on-balance drum and the "on-balance" sodium silicate tank was turned on. When no more sodium silicate solution remained in the "on-balance" tank, the emerging stream was switched to the drain. The final composition of this slurry was 27.1% acid alum solution; 72.9% sodium silicate solution; 3.21% $H_2SO_4$; 4.78% $Al_2(SO_4)_3 \cdot (16H_2O)$; 2.75% $Na_2O$; 8.87% $SiO_2$; 80.39% $H_2O$. To this was added 7 lb of ice and 9.2 lb of Thiele clay and the resultant slurry was colloid-milled.

The zeolite mixture and the clay-silica sol slurry were mixed and stirred for about 5 minutes. This mixture was spray dried producing 9.0 lb of coarse catalyst and 8.7 lb of fines. The catalyst was washed, ion exchanged, dried, calcined for 4 hours at 1000° F. and steamed at 1400° F. for 16 hours. The steamed catalyst was analyzed for Na composition, surface area, pore volume and attrition resistance as in Example 1. The results were as follows: Na=0.18 wt %; surface area=191 m₂/gm; pore volume=0.188 ml/mg; attrition=13.7 (Davison index).

EXAMPLE 6 (Comparative)

Catalyst was prepared as in Example 5 except that the ultrastable Y zeolite (75.24 $SiO_2$; 23.6% $Al_2O_3$; 0.65% Na) had an isoelectric point of 3.7 in the presence of sulfate before mixing. After steaming, the catalyst was analyzed for Na composition, surface area, pore volume and attrition resistance as in Example 5. The results were as follows: Na=0.19 wt %; surface area=207 m²/gm; pore volume=0.183 ml/mg; attrition$\leqq$37.6 (Davison index).

Having now fully described this invention, it will be appreciated by those skilled in the art that the same can be performed within a wide range of equivalent parameters of composition and conditions without departing from the spirit or scope of the invention or of any embodiment thereof.

What is claimed is:

1. A method of manufacturing a catalytic cracking catalyst comprising:
   providing a framework structure having a measurable isoelectric point, wherein the framework structure is at least one component selected from the group consisting of a crystalline tetrahedral framework oxide component, an active porous inorganic oxide catalyst framework component, and an inert catalyst framework component;
   providing an inorganic oxide sol having a measurable pH;
   measuring the isoelectric point of each component of the framework structure;
   measuring the pH of the inorganic oxide sol;
   matching the isoelectric point of each component of the framework structure to the pH of the inorganic oxide sol;
   combining in solution the inorganic oxide sol with each component of the framework structure; and
   drying the combined solution.

2. The method of claim 1, wherein the inorganic oxide sol is a silica sol or alumina sol.

3. The method of claim 1, wherein the inorganic oxide sol is provided by reacting a solution of sodium silicate with a solution of aluminum sulfate and sulfuric acid.

4. The method of claim 1, wherein the inorganic oxide sol is an aluminum chlorhydrol sol.

5. The method of claim 1, wherein the inorganic oxide sol has a pH of about 2–10.

6. The method of claim 1, wherein the framework structure includes at least one component selected from the group consisting of an active porous inorganic oxide catalyst framework component and an inert catalyst framework component, and the isoelectric point of the framework structure component is matched to within about 2 pH units of the inorganic oxide sol.

7. The method of claim 1, wherein the framework structure includes the tetrahedral framework oxide component and the isoelectric point of the tetrahedral framework oxide component is matched to within about 0.5 pH units of the inorganic oxide sol.

8. The method of claim 1, wherein the framework structure comprises a crystalline tetrahedral framework oxide component of silicon and aluminum having a Si/Al surface ratio of at least 0.5/1 and a Si/Al bulk ratio of at least about 2/1.

* * * * *